(12) United States Patent
Grechshammer et al.

(10) Patent No.: US 10,967,406 B2
(45) Date of Patent: Apr. 6, 2021

(54) BACKFLUSH DEVICE FOR FILTERS OF A SAMPLING SYSTEM

(71) Applicant: JCT Analysentechnik GmbH, Wiener Neustadt (AT)

(72) Inventors: Thomas Grechshammer, Lockenhaus (AT); Berndt Vancl, Mödling (AT); Günter Zimmel, Vienna (AT)

(73) Assignee: JCT ANALYSENTECHNIK GMBH, Wiener Neustadt (AT)

( * ) Notice: Subject to any disclaimer, the term of this patent is extended or adjusted under 35 U.S.C. 154(b) by 120 days.

(21) Appl. No.: 16/141,749

(22) Filed: Sep. 25, 2018

(65) Prior Publication Data

US 2019/0091734 A1    Mar. 28, 2019

(30) Foreign Application Priority Data

Sep. 27, 2017   (AT) .................................. 50179/2017

(51) Int. Cl.
*B08B 3/04* (2006.01)
*G01N 1/22* (2006.01)
*B01D 29/68* (2006.01)

(52) U.S. Cl.
CPC ............. *B08B 3/04* (2013.01); *G01N 1/2205* (2013.01); *G01N 1/2247* (2013.01); *B01D 29/68* (2013.01); *G01N 2001/2288* (2013.01)

(58) Field of Classification Search
CPC .......... B01D 29/66; B01D 29/68; B08B 3/04; G01N 1/2205; G01N 1/2247; G01N 2001/2288
See application file for complete search history.

(56) References Cited

U.S. PATENT DOCUMENTS

| 5,296,197 | A | * | 3/1994 | Newberg | ............... | F16K 41/103 |
|   |   |   |   |   |   | 137/240 |
| 5,908,550 | A | * | 6/1999 | Kaipainen | ............... | B01D 29/15 |
|   |   |   |   |   |   | 210/167.3 |
| 2002/0185430 | A1 | * | 12/2002 | Choi | ...................... | B01D 61/18 |
|   |   |   |   |   |   | 210/356 |

* cited by examiner

*Primary Examiner* — Terry K Cecil
(74) *Attorney, Agent, or Firm* — Workman Nydegger

(57) ABSTRACT

A backflush device for filters of a sampling system having a connecting element, which is passed through by a retrieval line that is connectable to the filter and which has at least one backflush line ending in the retrieval line, having a check valve arranged at or in the backflush line, where the check valve is connectable to a pressure line for a pressurized flush medium such that in the case of an open check valve, the backflush line may be flowed through by the flush medium in a backflush direction oriented towards the retrieval line, and where the backflush line ends in the retrieval line at an obtuse angle, observed in the direction of the backflush direction.

11 Claims, 1 Drawing Sheet

BACKFLUSH DEVICE FOR FILTERS OF A SAMPLING SYSTEM

The present application claims priority to Austrian Patent Application No. GM 50179/2017 filed with the Austrian Patent Office on Sep. 27, 2017, which is incorporated herein in its entirety by this reference.

The invention relates to a backflush device for filters of a sampling system having a connecting element, which is passed through by a retrieval line that is connectable to the filter and which has at least one backflush line ending in the retrieval line, having a check valve arranged at or in the backflush line, wherein the check valve is connectable to a pressure line for a pressurized flush medium such that in the case of an open check valve the backflush line may be flown through by the flush medium in a backflush direction oriented towards the retrieval line.

Sampling systems with backwashing devices are, for example, used in chimneys or exhaust systems in various industrial fields in order to sample gaseous or liquid media, for example. For this purpose, there is inserted a filter into, for instance, a chimney. This filter is connected to a retrieval line of the sampling system, through which sample material may be retrieved. When sampling, the sampling system extracts sample material from a medium to be sampled through the filter, wherein the medium to be sampled often contains impurities or suspended matter. For this reason, the filter will be contaminate in the course of repeated samplings as well as continuously due to the permanent exposure to the medium to be sampled. Contaminated filters will result therein that in each sampling there can be retrieved less sample material or that a higher negative pressure has to be formed in the retrieval line for sampling, respectively. In this way, the stress on the sampling system will increase continuously, which leads to reduced performance, increased component wear and a higher probability of system failures.

In order to counteract this process, the filters of sampling systems are cleaned using a backwashing device. In the course of a cleaning process it presses a flush medium in a backflush direction, which is the opposite direction to a retrieval direction for sample material in the retrieval line, through the filter. In this way, impurities, which have been deposited on the filter, will be removed, and the functionality of the sampling system may be ensured over a longer period of time than with such a device not being available. In this way, also the intervals between filter replacements may be increased, obtaining a higher availability of the sampling system.

Backflush devices according to prior art have a connecting element, which is passed through by the retrieval line. In the connecting element, a backflush line ends in the retrieval line, through which the flush medium is introduced into the retrieval line. In common backflush devices, the backflush line ends orthogonally in the retrieval line. Backflush devices according to prior art have the disadvantage that this assembly will lead to an essential flow resistance for the flush medium. This has negative effects on the performance of the backflush device as well as the effectiveness of filter cleaning. In order to counteract this effect, there has to be applied substantial pressure and a substantial amount of backflush medium for a cleaning process in backflush devices. As a result, it is necessary to configure the components of the backflush device appropriately massive, which has a negative effect on the production costs of the backflush device as well as of the entire sampling system.

It is the task of the present invention to provide a backflush device for filters of a sampling system, which overcomes the disadvantages mentioned above.

According to the invention, the present task is solved by the backflush line ending in the retrieval line at an obtuse angle, observed in the backflush direction.

The embodiment of the backflush device for filters of a sampling system according to the invention comprises a connecting element, which is passed through by a retrieval line that is connectable to the filter. The connecting element furthermore has a backflush line ending in the retrieval line. The backflush device comprises a check valve, which is connectable to a pressure line for pressurized flush medium, wherein the check valve is arranged at or in the backflush line. In the case of an open check valve, the flush medium can flow through the backflush line in a backflush direction oriented towards the retrieval line. With the backflush device according to the invention, the backflush line ends in the retrieval line at an obtuse angle, observed in the backflush direction. Due to the obtuse angle between backflush line and retrieval line, a substantially lower flow resistance advantageously will act on the flowing flush medium. It is especially advantageous that in this way there may be realized a higher flow rate of the flush medium than with backflush devices according to prior art. In this way, there is obtained a better cleaning function for the filter.

According to a preferred embodiment of the backflush device, the connecting element has a plurality of backflush lines, which are arranged radially about the retrieval line. In this way, compared to prior art, there may be introduced a larger amount of flush medium into the retrieval line, whereby there is obtained a further improvement of the cleaning performance of the backflush device.

According to an embodiment of the backflush device, the check valve is connected to a plurality of backflush lines. In this way, there is obtained an especially simple and cost-effective setup of the backflush device with simultaneously high cleaning performance.

According to another embodiment, the backflush device has a plurality of check valves, wherein each backflush line is connected respectively to one check valve. Thereby, there is obtained the advantage that also especially large filters may be cleaned using the backflush device according to the invention.

According to the preferred embodiment, the retrieval line has a filter end, at which the retrieval line is connectable to the filter. The retrieval line furthermore has in this embodiment an expansion of the cross-sectional area extending in the direction of the filter end. In this way, there are realized various flow rates for the backflush medium or the sample material within the retrieval line and turbulences are being suppressed.

According to the preferred embodiment, the expansion of the cross-sectional area of the retrieval line is located in a region, in which the backflush line ends in the retrieval line. In this way, the flow resistance for the backflush medium will be further reduced.

In the preferred embodiment the pressure line is connected to the backflush line, wherein the pressure line has a magnet valve. In this way, there is given the advantage that abrupt increases of pressure of the flush medium may be realized. It is especially advantageous that due to the shock waves of the flush medium generated in such a way the cleaning performance of the backflush device may be further improved.

In an embodiment of the backflush device, the pressure line is connected to a pressure reservoir. The pressure reservoir contains pressurized flush medium. In this way there is given the advantage that the provision of the backflush medium is realized in a passive way, without using any additional, for example, electrically operated, aggregates.

According to another embodiment of the backflush device, the pressure line is connected to a pressure generating unit, which is configured to provide flush medium under pressure. In this way, there may be realized a continuous flow of flush medium having a variable pressure. The pressure generating unit may be present, for example, in the form of a compressor.

Advantageous embodiments of the backflush device according to the invention as well as alternative embodiments are explained in greater detail by way of the figures in the following.

Figure 1:
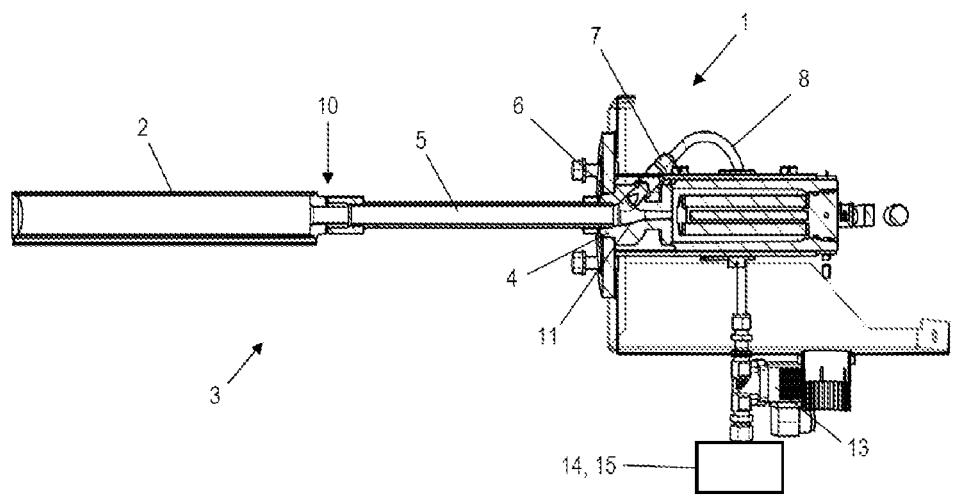
FIG. 1 shows a sectional view of a backflush device according to the invention in a side view.
Figure 2:
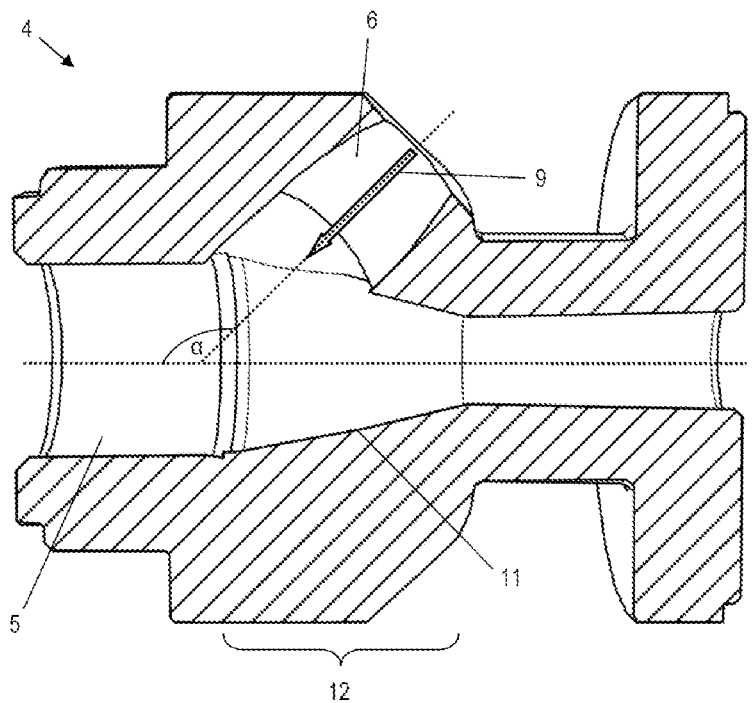
FIG. 2 shows a sectional view of a connecting element of the backflush device according to the invention in a side view.

FIG. 1 shows a backflush device 1 according to the invention for filters 2 of a sampling system 3 having a connecting element 4. The connecting element 4 is passed through by a retrieval line 5, which in this embodiment is realized as a through-hole. In the connecting element 4, a backflush line 6 ends in the retrieval line 5. The backflush device 1 furthermore has a check valve 7, which is arranged at or in the backflush line 6. The check valve 7 is connectable to a pressure line 8 for pressurized flush medium. In FIG. 1, the pressure line 8 is depicted connected to the check valve 7. According to the invention, the check valve may also be integrated in the pressure line 8. In the case of an open check valve 7, flush medium may flow through the backflush line 6, wherein this herein flows in a backflush direction 9 oriented towards the retrieval line 5, which is depicted by an arrow in FIG. 2. The backflush line 6 ends in the retrieval line 5 at an obtuse angle α, observed in the backflush direction 9, which is also depicted in FIG. 2. The obtuse angle α herein lies in a range between 90° and 180°, preferably in a range of 120° to 160°. During the process of filter cleaning, the backflush medium flows through the backflush line 6 into the retrieval line 5 and further through the filter 2. In this way, the filter 2 is cleaned from deposits and impurities, which are discharged towards the outside. Due to the configuration of the backflush device 1 according to the invention, in particular due to the obtuse angle α between the backflush line 6 and the retrieval line 5, the flow resistance, which is generated by the backflush line 6 ending in the retrieval line 5, will be reduced. It is especially advantageous that the pressure loss of the flush medium within the backflush device 1 is reduced and that a higher velocity of approach of the flush medium towards the filter 2 may be achieved. In this way, the effectivity of filter cleaning will be increased.

FIG. 2 shows the connecting element 4 of the backflush device 1 according to the invention in a sectional view, wherein the backflush line 6 and the retrieval line 5 passing through the connecting element 4 are depicted. Furthermore there is depicted the backflush direction 9 extending from the backflush line 6 to the retrieval line 5 as well as the obtuse angle α between the backflush line 6 and the retrieval line 5. For a better illustration of the obtuse angle α, there are furthermore depicted by dotted lines the longitudinal axes of the retrieval line 5 and the backflush line 6 in the connecting element 4.

In the preferred embodiment of the backflush device 1, the connecting element 4 has a plurality of backflush lines 6. In this embodiment, these are arranged radially about the retrieval line 5. In this way there is given the advantage that a larger amount of flush medium may be introduced into the retrieval line 5 in distributed way. This is advantageous in particular for larger filters 2 in order to obtain a good cleaning effect. By the radial arrangement of the backflush lines 6 about the retrieval line 5 there is further obtained the advantage that the connecting element 4 does not have any enlarged dimensions in comparison to a connecting element 4 having only one backflush line 6. In this way it is further possible to replace a connecting element 4 having only one backflush line 6 by a connecting element 4 having several backflush lines 6, without comprehensive constructive alterations to the entire backflush device 1 or the sampling system 3.

According to an embodiment, the check valve 7 depicted in FIG. 1 is connected to a plurality of backflush lines 6. In this way there is given the advantage that there is realized a simple and cost-effective setup of the backflush device 1 with simultaneously high cleaning performance. Furthermore, the backflush device 1 may in another embodiment also have a plurality of check valves 7, wherein each backflush line 6 is connected to respectively one check valve 7. In this way, it is also possible to clean especially large filters 2 using the backflush device 1 according to the invention.

The retrieval line 5 of the backflush device 1 according to the invention further has a filter end 10, which is depicted in FIG. 1. The filter 2 is connectable at the filter end 10 to the retrieval line 5, wherein in FIG. 1 the filter end 10 is depicted with a connected filter 2. According to the preferred embodiment, the retrieval line 5 has an expansion 11 of the cross-sectional area extending in the direction of the filter end 10. In the preferred embodiment, this expansion 11 of the cross-sectional area of the retrieval line 5 is located in a region 12, as depicted in FIG. 2, in which the backflush line 6 ends in the retrieval line 5. As depicted in FIG. 2, this region 12 is situated within the connecting element 4.

According to the preferred embodiment of the backflush device 1, the backflush device 1 further comprises the pressure line 8, which is connected to the backflush line 6. The pressure line 8 has a magnet valve 13, which is depicted in FIG. 1. In this way, there may be realized abrupt pressure increases of the flush medium, whereby the flush medium shock-like flushes the filter 2, obtaining an excellent cleaning performance of the backflush device 1. In an embodiment the pressure line 8 may furthermore be connected to a pressure reservoir 14. This contains pressurized flush medium. The pressure reservoir 14 may be provided, for example, in the form of a compressed gas cylinder or a container with pressurized liquid. In this way there is given the advantage that the provision of the flush medium is realized in a passive way, without using any additional, for example electrically operated, aggregates. Further forms of the pressure reservoir 14 will be obvious for those skilled in the art from this exemplary reference. In a further embodiment, the pressure line 8 is connected to a pressure generating unit 15. The pressure generating unit 15 also provides flush medium under pressure. By using the pressure generating unit 15 there is given the advantage that there may be realized a continuous flow of flush medium having variable pressure. The pressure generating unit 15 may be present, for example, in the form of a compressor. As an example, there are to be mentioned compressors in the form of piston compressors, screw compressors, turbo compressors and so on. Further forms of compressors will be obvious for those skilled in the art from this exemplary reference.

The invention claimed is:

1. A backflush device for filters of a sampling system, the backflush device having a connecting element which defines, within a body of the connecting element, a first portion of a retrieval line, and the retrieval line includes a second portion external to the body that communicates with the first portion and that includes a filter end that is connectable to a filter and the connecting element having at least one backflush line ending in the retrieval line, and having a check valve arranged at or in the backflush line, wherein the check valve is connectable to a pressure line for a pressurized flush medium such that in the case of an open check valve the backflush line may be flowed through by the flush medium in a backflush direction oriented towards the retrieval line, and wherein the backflush line ends in the retrieval line at an obtuse angle, observed in the direction of the backflush direction.

2. A backflush device according to claim 1, wherein the connecting element has a plurality of backflush lines, which are arranged radially about the retrieval line.

3. A backflush device according to claim 1, wherein the check valve is connected to a plurality of backflush lines.

4. A backflush device according to claim 1, wherein the backflush device has a plurality of check valves, and wherein each backflush line is connected to a respective check valve.

5. A backflush device according to claim 1, wherein the retrieval line has an expansion of a cross-sectional area oriented in the direction of the filter end.

6. A backflush device according to claim 5, wherein the expansion of the cross-sectional area of the retrieval line is present in a region, in which the backflush line ends in the retrieval line.

7. A backflush device according claim 1, wherein the pressure line is connected to the backflush line, and wherein the pressure line has a magnet valve.

8. A backflush device according to claim 7, wherein the pressure line is connected to a pressure reservoir, which is configured to contain pressurized flush medium.

9. A backflush device according to claim 7, wherein the pressure line is connected to a pressure generating unit, which is configured to provide flush medium under pressure.

10. A backflush device according to claim 9, wherein the pressure generating unit is a compressor.

11. A backflush device according to claim 1, wherein the obtuse angle lies in a range between 90° and 180°.

* * * * *